United States Patent
Wang et al.

(10) Patent No.: US 11,783,525 B2
(45) Date of Patent: Oct. 10, 2023

(54) METHOD, DEVICE AND STORAGE MEDIUM FORM PLAYING ANIMATION OF A CAPTURED IMAGE

(71) Applicant: BEIJING XIAOMI MOBILE SOFTWARE CO., LTD., Beijing (CN)

(72) Inventors: Qian Wang, Beijing (CN); Yan He, Beijing (CN); Bin Zhang, Beijing (CN); Bowen Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 37 days.

(21) Appl. No.: 17/387,008

(22) Filed: Jul. 28, 2021

(65) Prior Publication Data
US 2022/0254085 A1    Aug. 11, 2022

(30) Foreign Application Priority Data
Feb. 8, 2021   (CN) .......................... 202110172496.0

(51) Int. Cl.
*G06T 13/80*   (2011.01)
(52) U.S. Cl.
CPC .................................. *G06T 13/80* (2013.01)
(58) Field of Classification Search
CPC ............ G06T 13/00–80; H04N 23/633; G11B 27/34; G06F 3/0481; G06F 9/451
See application file for complete search history.

(56) References Cited

U.S. PATENT DOCUMENTS

| | | | |
|---|---|---|---|
| 2006/0055700 A1* | 3/2006 | Niles ....................... | G06T 13/20 345/473 |
| 2009/0141045 A1* | 6/2009 | Jackson .................. | G09G 5/391 345/658 |
| 2009/0322893 A1 | 12/2009 | Stallings et al. | |
| 2011/0251896 A1* | 10/2011 | Impollonia ............ | H04N 21/84 705/14.55 |
| 2013/0222663 A1* | 8/2013 | Rydenhag .......... | H04N 5/23216 348/E5.022 |
| 2018/0335939 A1* | 11/2018 | Karunamuni ......... | G06F 3/0481 |
| 2020/0005736 A1* | 1/2020 | Peng ....................... | G09G 5/377 |

FOREIGN PATENT DOCUMENTS

WO   WO 2019137429 A1   7/2019

OTHER PUBLICATIONS

European Patent Application No. 21188365.7, Search and Opinion dated Jan. 18, 2022, 9 pages.

* cited by examiner

*Primary Examiner* — Phi Hoang
(74) *Attorney, Agent, or Firm* — COZEN O'CONNOR

(57) ABSTRACT

The disclosure relates to a method for playing an animation. The method includes: obtaining a target animation based on a setting operation for switching between a camera application and an image storage program. The target animation is an animation of a target image displayed when switching between the camera application and the image storage program. The target animation is played in a transparent window. The transparent window covers an application interface of the camera application as an upper layer of the application interface.

12 Claims, 14 Drawing Sheets

METHOD, DEVICE AND STORAGE MEDIUM FORM PLAYING ANIMATION OF A CAPTURED IMAGE

CROSS REFERENCE TO RELATED APPLICATIONS

This application claims priority and benefits to Chinese Application No. 202110172496.0, filed on Feb. 8, 2021, the entire content of which is incorporated herein by reference.

TECHNICAL FIELD

The disclosure relates to a field of terminal technologies, and particularly, to a method for playing an animation, an apparatus for playing an animation, an electronic device and a storage medium.

BACKGROUND

With the development of terminal technologies, a terminal device (e.g., a smart phone) can provide more and more functionalities. For example, photographing or photo-taking based on a mounted camera and an installed camera application is one of the indispensable functions of the smart phone. Currently, the photo-taking interface of the camera application in most terminal devices is generally provided with an album button (e.g., a thumbnail of the latest photographed image in the album), and the user may access the album by clicking the album button.

SUMMARY

A method for playing an animation is provided. In one embodiment, the method includes: obtaining a target animation in response to detecting a setting operation for switching between a camera application and an image storage program, the target animation being an animation of a target image displayed when switching between the camera application and the image storage program; and playing the target animation in a transparent window, the transparent window covering an application interface of the camera application as an upper layer of the application interface.

An electronic device is provided. In one embodiment, the electronic device includes: a processor and a memory for storing instructions executable by the processor. The processor is configured to: obtain a target animation in response to detecting a setting operation for switching between a camera application and an image storage program, the target animation being an animation of a target image displayed when switching between the camera application and the image storage program; and play the target animation in a transparent window, the transparent window covering an application interface of the camera application as an upper layer of the application interface.

A non-transitory computer-readable storage medium is provided, which has computer program instructions stored thereon. In one embodiment, when the program instructions are executed by a processor, the processor is configured to: obtain a target animation in response to detecting a setting operation for switching between a camera application and an image storage program, the target animation being an animation of a target image displayed when switching between the camera application and the image storage program; and play the target animation in a transparent window, the transparent window covering an application interface of the camera application as an upper layer of the application interface.

It should be understood that the above general description and the following detailed description are only exemplary, and do not limit the disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Now, a preset animation can be displayed when accessing an album on a terminal device, and generally, the preset animation has a black systematic background, which results in a simple animation display effect. In view of this, the disclosure provides a method for playing an animation, an apparatus for playing an animation, a related electronic device, and a related storage medium, which will be described in detail below.

With the method, the apparatus, the electronic device or the storage medium, the target animation is obtained in response to detecting the setting operation for switching between the camera application and the image storage program, and the target animation is displayed in a transparent window. In this way, it is possible to display a photo-taking interface of the camera application while displaying the target animation, so that the user sees the target animation and the photo-taking interface of the camera application at the same time, to improve the display effect of the animation, and to visually improve smoothness of switching between the camera application and the image storage program, thereby enhancing the user experience.

Figure 1:
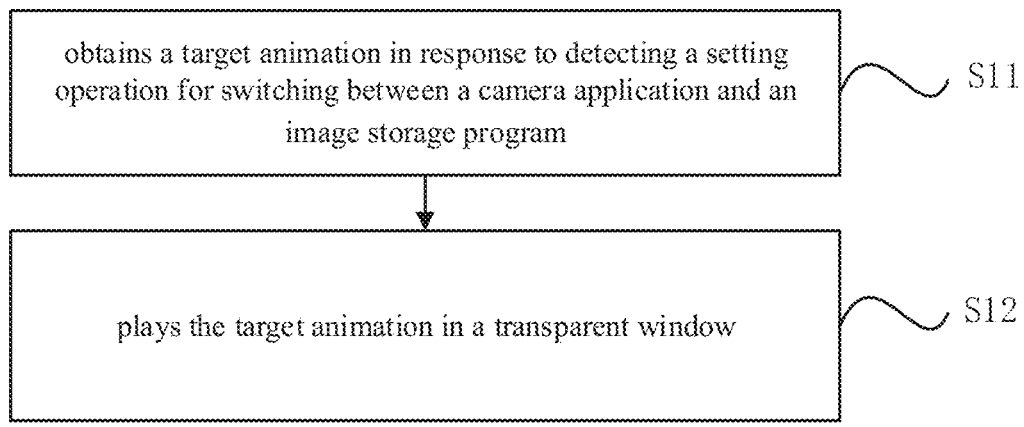
FIG. 1 is a flowchart illustrating a method for playing an animation according to some embodiments of the disclosure.

FIG. 1 is a flowchart illustrating a method for playing an animation according to some embodiments of the disclosure. The method is applied to a terminal device, such as a smart phone, a tablet computer, a notebook computer or a wearable device.

As illustrated in FIG. 1, the method includes the following.

At block S11, a target animation is obtained in response to detecting a setting operation for switching between a camera application and an image storage program.

In some examples, after a first application (a camera application or an image storage program) is launched by a user on the terminal device, the setting operation on the first application can be triggered. For example, an operation on a preset control or a displayed object (e.g., an image) in an interface of the first application can be triggered.

After the terminal device detects the setting operation, target animation can be obtained. The target animation may be an animation of a target image displayed while switching between the camera application and the image storage program. In other words, the target animation may be used to show a process of switching between the camera application and the image storage program.

For example, the target animation may include multiple frames, and each frame may be a predetermined thumbnail of the target image. The thumbnails may be arranged in a specific order (for example, in descending order or ascending order of a size of the thumbnail). When the thumbnails are arranged in ascending order of the size, the target animation represents a change process that the target image is enlarged from small to large until reaching a display state (such as the original size of the target image). When the thumbnails are arranged in descending order of the size, the target animation represents a change process that the target image is gradually reduced from the display state (its original size) to its minimal size.

At block S12, the target animation is played in a transparent window.

In some examples, after the target animation is generated in response to detecting the setting operation performed on the first application, a transparent window for displaying the target animation may be formed on a photo-taking interface of the camera application.

Take the Android system as an example, a new window can be generated based on the mechanism of the Android system as transparent. For example, a configuration file for generating the transparent window may be written in advance to define various services or activities related to generating the transparent window, and the transparent window can be formed by executing the configuration file in the camera application. It is to be noted that, in addition to the above-mentioned method for generating the transparent window, other methods for generating the transparent window in the related art may also be used based on actual needs, which is not limited in the disclosure.

After the transparent window is generated, the target animation may be played on the transparent window. The size of the transparent window may be set to be smaller than or equal to the size of the photo-taking interface of the camera application. For example, in the case where the frame of the target animation does not cover the entirety of the transparent window (the size of the transparent window is greater than the size of the frame), a preview image set for the camera application can be displayed in a remaining region of the transparent window that does not display an image (the image is the frame of the target animation, which is the thumbnail).

It is to be noted that when it is detected that the terminal device is in a portrait state, the target animation may be played in the transparent window directly based on the first application (i.e., the camera application or the image storage program). When it is detected that the terminal device is in a landscape state, the target animation may be sent to a system framework of the terminal device (for example, the Android system framework), and the target animation is displayed in the transparent window based on the system framework.

With the method according to the disclosure, the target animation is obtained in response to detecting the setting operation for switching between the camera application and the image storage program, and the target animation is played in the transparent window. In this way, it is possible to display the photo-taking interface of the camera application while displaying the target animation, such that the user can view both the target animation and the photo-taking interface of the camera application at the same time. The display effect of the animation is improved, the visual smoothness of switching between the camera application and the image storage program is improved, and the user experience is enhanced.

Figure 2A:
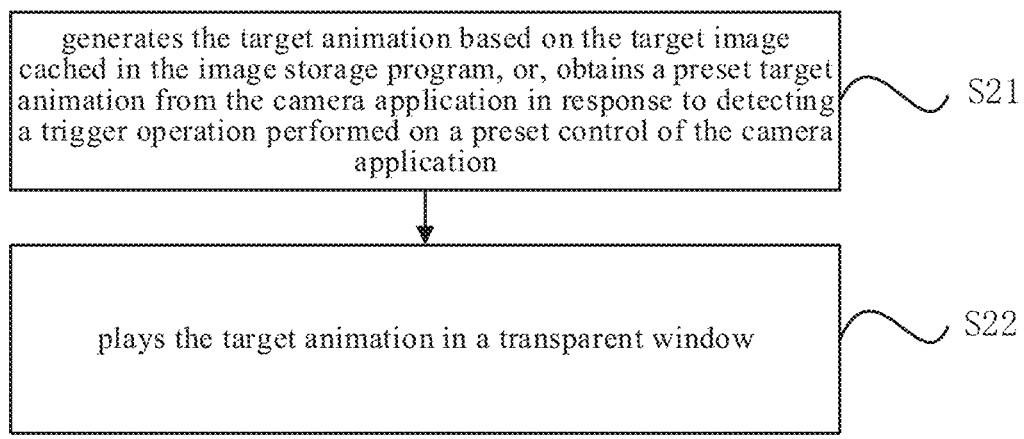
FIG. 2A is a flowchart illustrating a method for playing an animation according to some embodiments of the disclosure.

FIG. 2A is a flowchart illustrating a method for playing an animation according some embodiments of the disclosure. The method is applied to a terminal device, e.g., a smart phone, a tablet computer, a notebook computer or a wearable device.

Figure 2B:
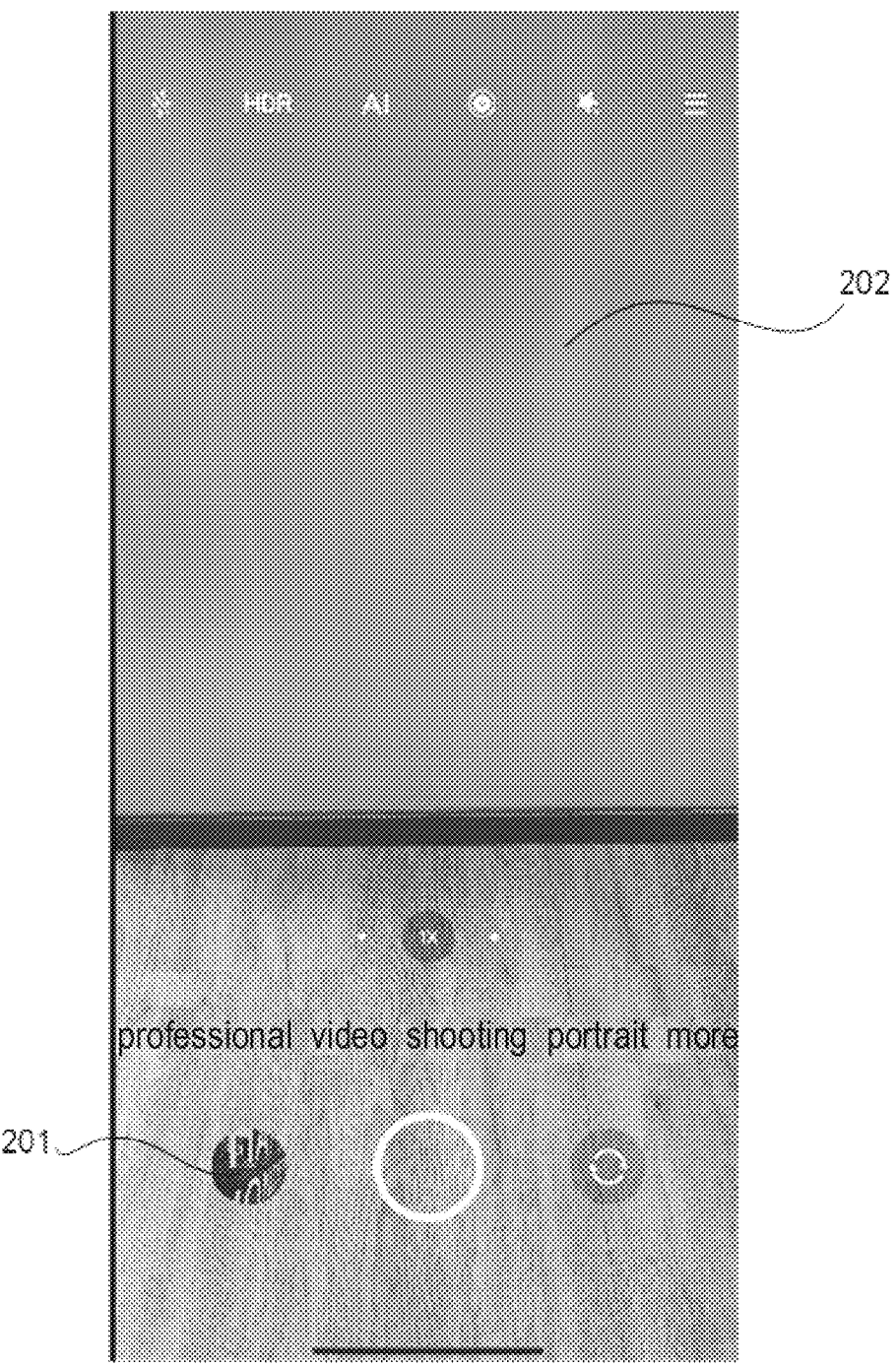
FIG. 2B is a schematic diagram illustrating a photo-taking interface of a camera application in a portrait state according to some embodiments of the disclosure.
Figure 2C:
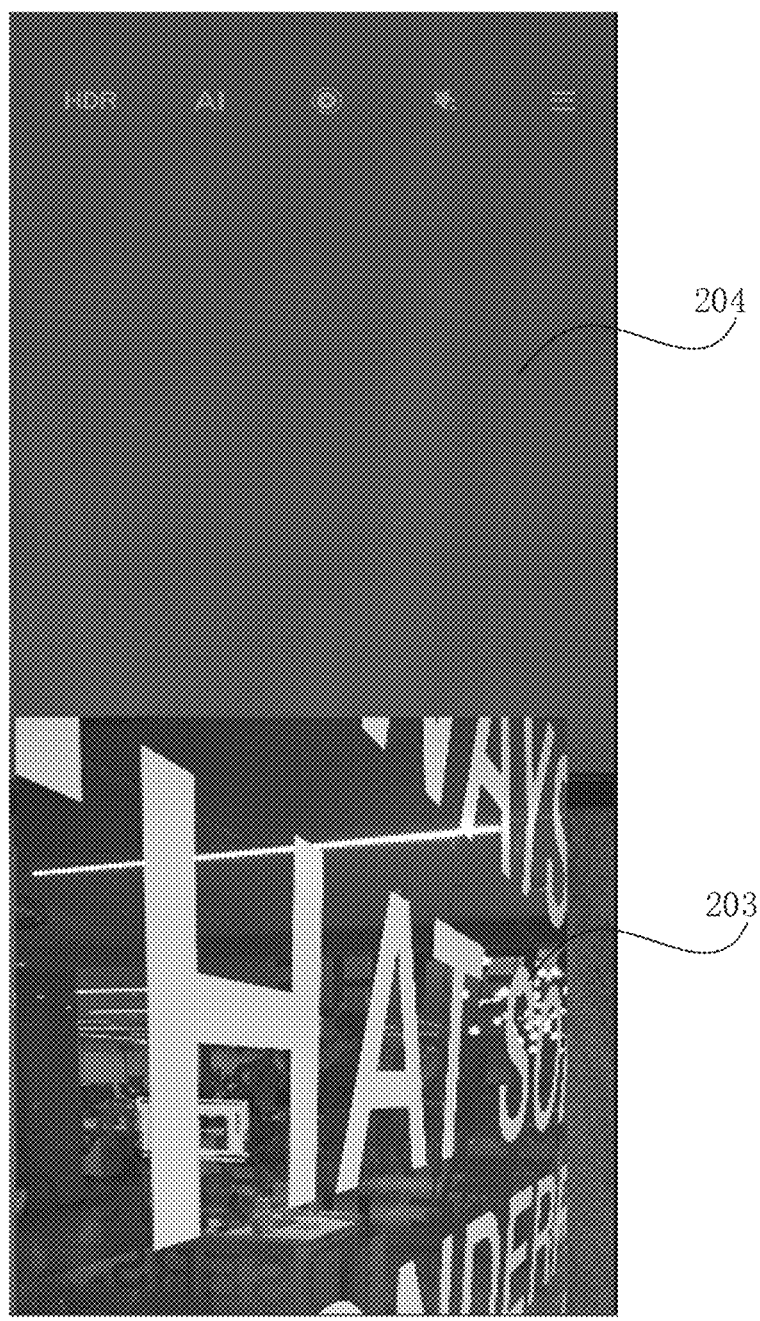
FIG. 2C is a schematic diagram illustrating another photo-taking interface of a camera application in a portrait state according to some embodiments of the disclosure.
Figure 2D:
FIG. 2D is a schematic diagram illustrating a target image displaying interface in a portrait state according to some embodiments of the disclosure.

A photo-taking interface of the camera application in a portrait state is illustrated in FIG. 2B. Another photo-taking interface of the camera application in a portrait state is illustrated in FIG. 2C. A target image displaying interface in a portrait state is illustrated in FIG. 2D. A photo-taking interface of the camera interface in a landscape state illustrated in FIG. 2E. Another photo-taking interface of the camera interface in a landscape state is illustrated in FIG. 2F. A target image displaying interface in a landscape state is illustrated in FIG. 2G.

It is to be noted that, although only two photo-taking interfaces in the portrait state or in the landscape state are shown in the disclosure, more than two photo-taking interfaces can be included.

The target animation can be used to show the process of switching between the camera application and the image storage program. As illustrated in FIG. 2A, the method for playing an animation may include the following.

At block S21, the target animation is generated based on a target image cached in the image storage program or a preset target animation is obtained from the camera application in response to detecting a trigger operation performed on a preset control of the camera application.

In some embodiments, the image storage program may be a program, such as an album program, for caching images captured within a preset time period.

For example, as illustrated in FIG. 2B, after the camera application is launched by the user on the terminal device, a trigger operation can be performed on the preset control (i.e., a preset button 201 for launching the album program) in the camera application. The type of the trigger operation includes clicking operation, which is not limited in the disclosure. An icon of the preset control may be a thumbnail of the target image cached in the image storage program, e.g., the thumbnail of an image that is most recently captured and stored in the image storage program. When the terminal device detects the trigger operation on the button 201, the preset target animation can be obtained from the camera application, or the target animation can be generated based on the target image. The target animation may be played to represent the process of launching the album program from the camera application.

In some examples, the above-mentioned target animation may include multiple frames, and each frame may be a thumbnail of the target image of a different size. In other words, the frames are generated by scaling the target image with respective scaling ratios. For example, the image 203 illustrated in FIG. 2C is a thumbnail of the target image having a scaling ratio of 50%. The thumbnails of the target image forming the target animation may be arranged in an ascending order of the size of the thumbnail. That is, from the target animation, in a perspective of the user, it looks like that the target image is gradually enlarged from a button state (i.e., the thumbnail of the target image is displayed as the icon of the button) illustrated in FIG. 2B to a thumbnail state illustrated in FIG. 2C, and then to a display state (i.e., the target image fully covers the screen in the portrait state) illustrated in FIG. 2D.

In some examples, as illustrated in FIG. 2C, the image 203 of the target animation does not fully cover the transparent window, and a preview image 204 set for the photo-taking interface of the camera application may be displayed in a remaining region of the transparent window where the thumbnail is not displayed.

Figure 2E:
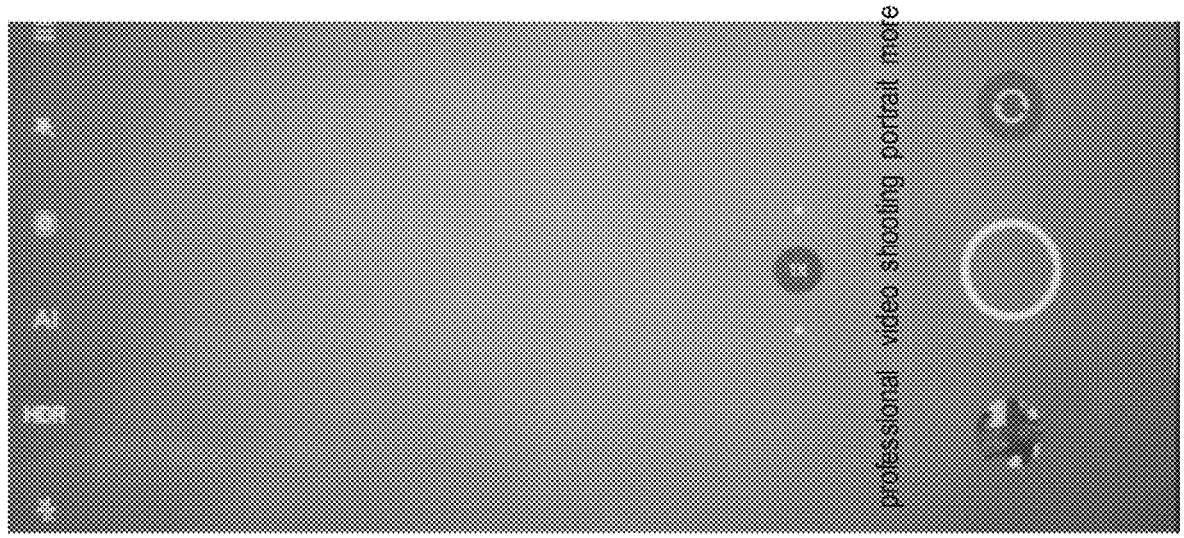
FIG. 2E is a schematic diagram illustrating a photo-taking interface of a camera application in a landscape state according to some embodiments of the disclosure.
Figure 2F:
FIG. 2F is a schematic diagram illustrating another photo-taking interface of a camera application in a landscape state according to some embodiments of the disclosure.
Figure 2G:
FIG. 2G is a schematic diagram illustrating a target image displaying interface in a landscape state according to some embodiments of the disclosure.

In some examples, when the terminal device is in the landscape state, the target image is gradually enlarged from a button state (i.e., the thumbnail of the target image is displayed as the icon of the button) illustrated in FIG. 2E to a thumbnail state illustrated in FIG. 2F, and to a display state (i.e., the target image fully covers the screen in the landscape state) illustrated in FIG. 2G.

At block S22, the target animation is played in a transparent window. The transparent window is an upper layer of an application interface and covers an application interface.

For relevant explanation and description of block S22, reference may be made to block S12 of FIG. 1, which is not repeated here.

With the method according to embodiments of the disclosure, the target animation is generated based on the target image cached in the image storage program or the preset target animation is obtained from the camera application in response to detecting the trigger operation performed on the preset control of the camera application, and the target animation is played in the transparent window. In this way, it is possible to display the photo-taking interface of the camera application while displaying the target animation, such that the user can view both the target animation and the photo-taking interface of the camera application at the same time. The display effect of the animation is improved, and visual smoothness of switching between the camera application and the image storage program is improved, and the user experience is enhanced.

Figure 3:
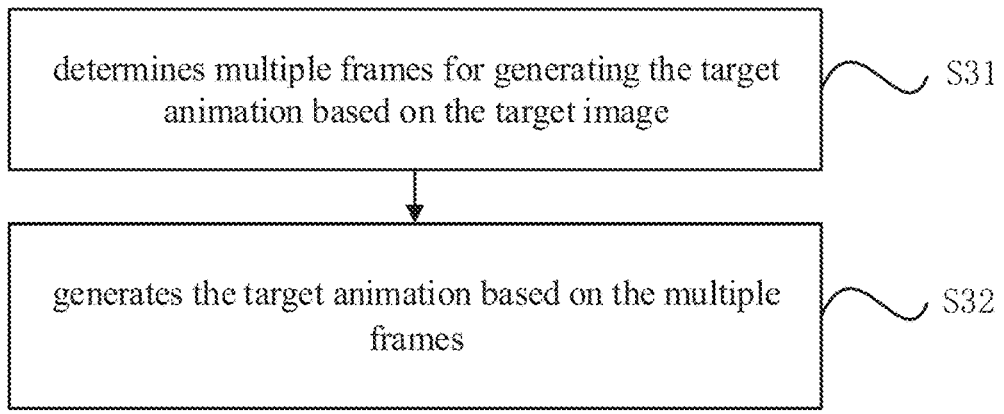
FIG. 3 is a flowchart illustrating a process of generating a target animation based on a target image cached in an image storage program according to some embodiments of the disclosure.

FIG. 3 is a flowchart illustrating a process of generating a target animation based on a target image cached in a second application according to some embodiments of the disclosure. As illustrated in FIG. 3, generating the target animation based on the target image cached in the image storage program of block S21 includes the following.

At block S211, multiple frames for generating the target animation are determined based on the target image.

In some examples, after acquiring the target image cached in the image storage program, multiple frames for generating the target animation may be determined based on the target image. Each frame may be a thumbnail of the target image.

At block S212, the target animation is generated based on the multiple frames.

In some examples, after determining the multiple frames for generating the target animation based on the target image, the target animation may be generated based on the multiple frames. The frames may be arranged for example in ascending order of the size to generate the target animation.

Figure 4:
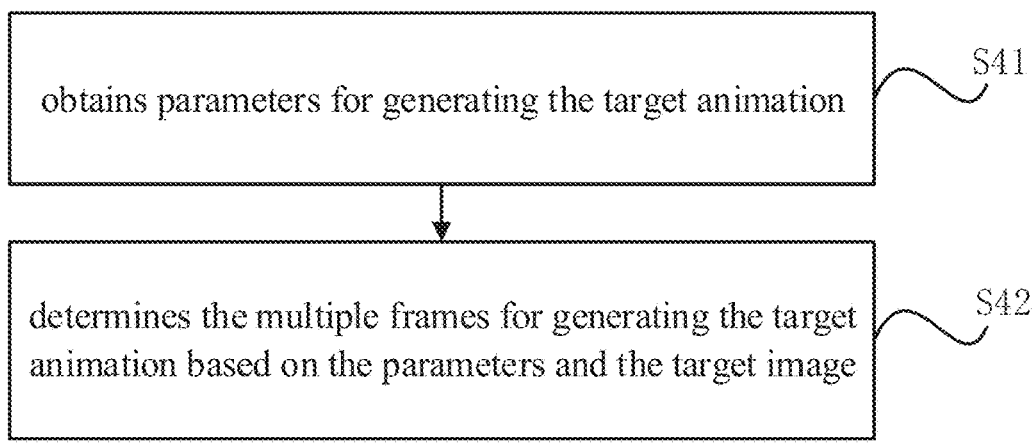
FIG. 4 is a flowchart illustrating a process of determining multiple frames for generating the target animation based on the target image according to some embodiments of the disclosure.

For example, FIG. 4 is a flowchart illustrating a process of determining multiple frames for generating the target animation based on the target image according to some embodiments of the disclosure. As illustrated in FIG. 4, the block S31 may include the following.

At block S41, parameters for generating the target animation are obtained.

In some examples, when the terminal device detects the trigger operation performed on the preset control in the camera application, the parameters for generating the target animation may be obtained from the camera application to generate the target animation.

The parameters of the target animation may be such as image size and animation playback duration preset in the camera application, which is not limited in the disclosure.

For example, the parameters may include a first size of a first frame of the target animation, a second size of a last frame of the target animation, and a playback duration of the target animation.

At block S42, the multiple frames for generating the target animation are determined based on the parameters and the target image.

In some examples, after obtaining the parameters for generating the target animation and the target image, the multiple frames used for generating the target animation may be determined based on the parameters and the target image.

Figure 5:
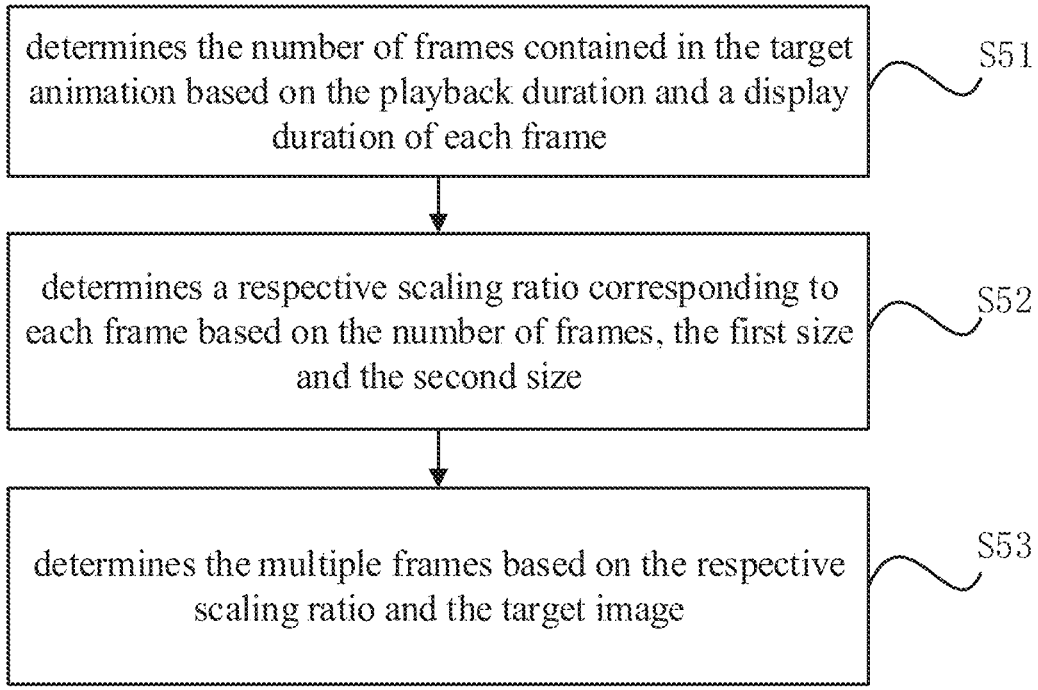
FIG. 5 is a flowchart illustrating a process of determining multiple frames for generating the target animation based on the parameters and the target image according to some embodiments of the disclosure.

For example, FIG. 5 is a flowchart illustrating a process of determining the multiple frames for generating the target animation based on the parameters and the target image according to some embodiments of the disclosure. As illustrated in FIG. 5, the block S42 may further include the following.

At block S51, the number of frames contained in the target animation is determined based on the playback duration and a display duration of each frame.

It can be understood that the number of frames contained in the target animation may be determined based on a ratio of the playback duration to the display duration.

For example, the playback duration of the target animation is 200 ms, and the display duration of each frame in the animation is 20 ms. In this case, it can be determined that the number of frames contained in the target animation is 10. It is understandable that the above playback duration of the animation and the display duration of each frame are only used for exemplary description. In actual applications, free settings may be made based on business needs, which is not limited in the disclosure.

At block S52, a respective scaling ratio corresponding to each frame is determined based on the number of frames, the first size and the second size.

In some examples, after determining the number of frames contained in the target animation based on the playback duration and the display duration of each frame, the respective scaling ratio corresponding to each frame can be determined based on the number of frames, the first size and the second size.

In some examples, the scaling ratios corresponding to the multiple frames may be evenly changed.

For example, the first frame is a thumbnail obtained by scaling the original image based on the scaling ratio of 10%, and the last frame is a thumbnail obtained by scaling the original image based on the scaling ratio of 100%. The frames between the first image and the last image may be thumbnails obtained by scaling the original image respectively based on the scaling ratios of 20%, 30%, . . . , 80%, and 90%. That is, the scaling ratio corresponding to each frame is uniformly increased.

At block S53, the multiple frames are determined based on the respective scaling ratio and the target image.

In some examples, after the respective scaling ratio corresponding to each frame is determined based on the number of frames, the first size and the second size, the multiple frames can be determined based on the respective scaling ratio and the target image.

Figure 6:
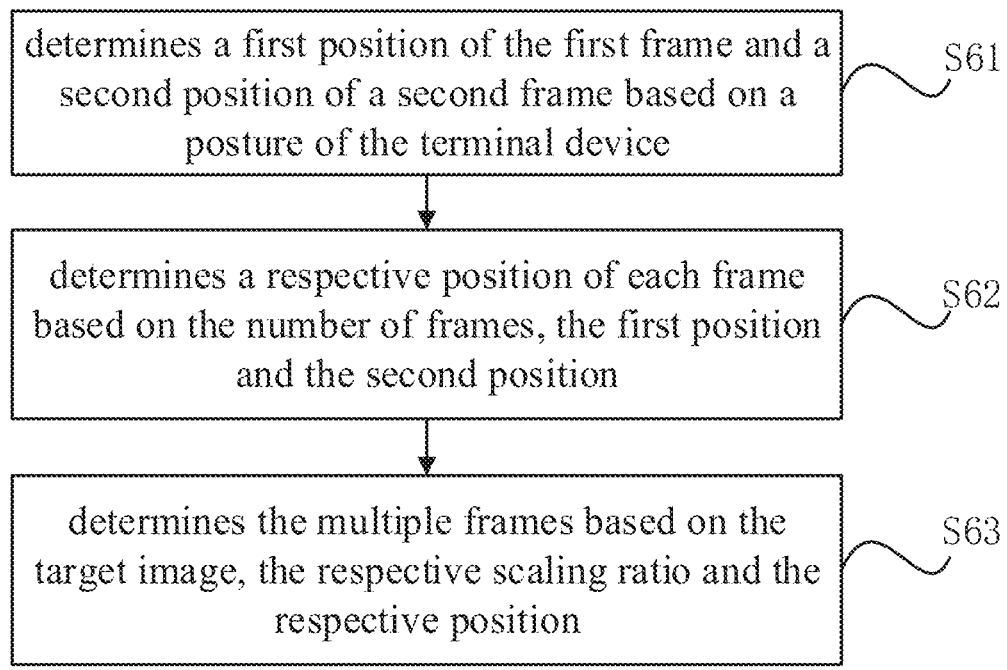
FIG. 6 is a flowchart illustrating a process of determining multiple frames based on the respective scaling ratio and the target image according to some embodiments of the disclosure.

For example, FIG. 6 is a flowchart illustrating a process of determining the multiple frames based on the respective scaling ratio and the target image according to some embodiments of the disclosure. As illustrated in FIG. 6, the block S53 may further include the following.

At block S61, a first position of the first frame and a second position of a second frame are determined based on a posture of the terminal device.

At block S62, a respective position of each frame is determined based on the number of frames, the first position and the second position.

At block S63, the multiple frames are determined based on the target image, the respective scaling ratio and the respective position.

In some examples, a current posture of the terminal device may be detected by a posture sensor (for example, a magnetic sensor or a gravity sensor) mounted on the terminal device. For example, it can be detected that the terminal device is in a landscape state or a portrait state. The first position of the first frame and the second position of the last frame in the target animation may be determined based on the posture of the terminal device.

For example, when it is detected that the terminal device is in the landscape state (i.e., the mobile phone rotates 90° around the z-axis), it can be determined that the first position is a set position at an upper left corner of the screen, and the second position is a center position of a horizontal frame on the screen.

When it is detected that the terminal device is in an inverse landscape state (i.e., the mobile phone rotates 270° around the z-axis), it can be determined that the first position is a set position at a lower right corner of the screen, and the second position is a center position of a horizontal frame on the screen.

When it is detected that the terminal device is the portrait state, it can be determined that the first position is a set position at a lower right corner of the screen, and the second position is a center position of a portrait frame on the screen.

It can be understood that the position of the image described above may be a position of the set point (e.g., the center point) in the image, which is not limited in the disclosure.

The multiple frames can be determined based on the target image, the respective scaling ratio corresponding to each frame, and the respective position of each frame.

Figure 7A:
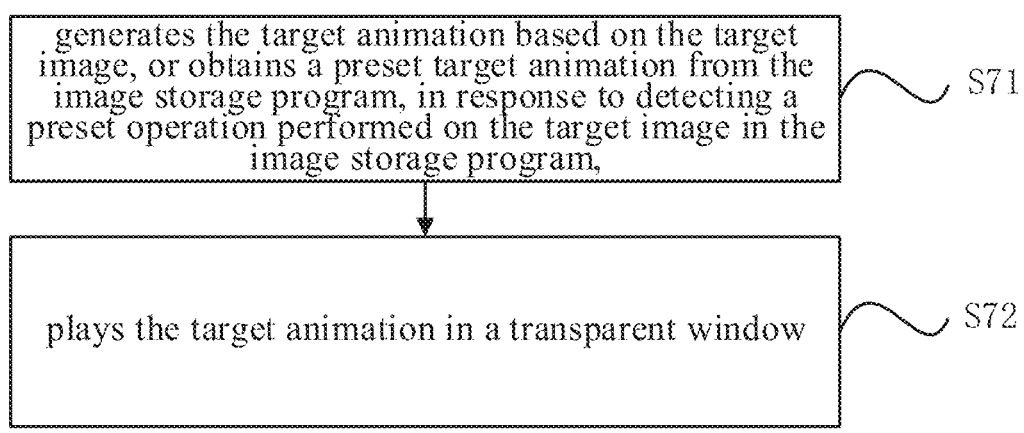
FIG. 7A is a flowchart illustrating a method for playing an animation according to some embodiments of the disclosure.

FIG. 7A is a flowchart illustrating a method for playing an animation according to some embodiments of the disclosure. The method according to the disclosure may be applied to a terminal device, such as a smart phone, a tablet computer, a notebook computer, or a wearable device.

Figure 7B:
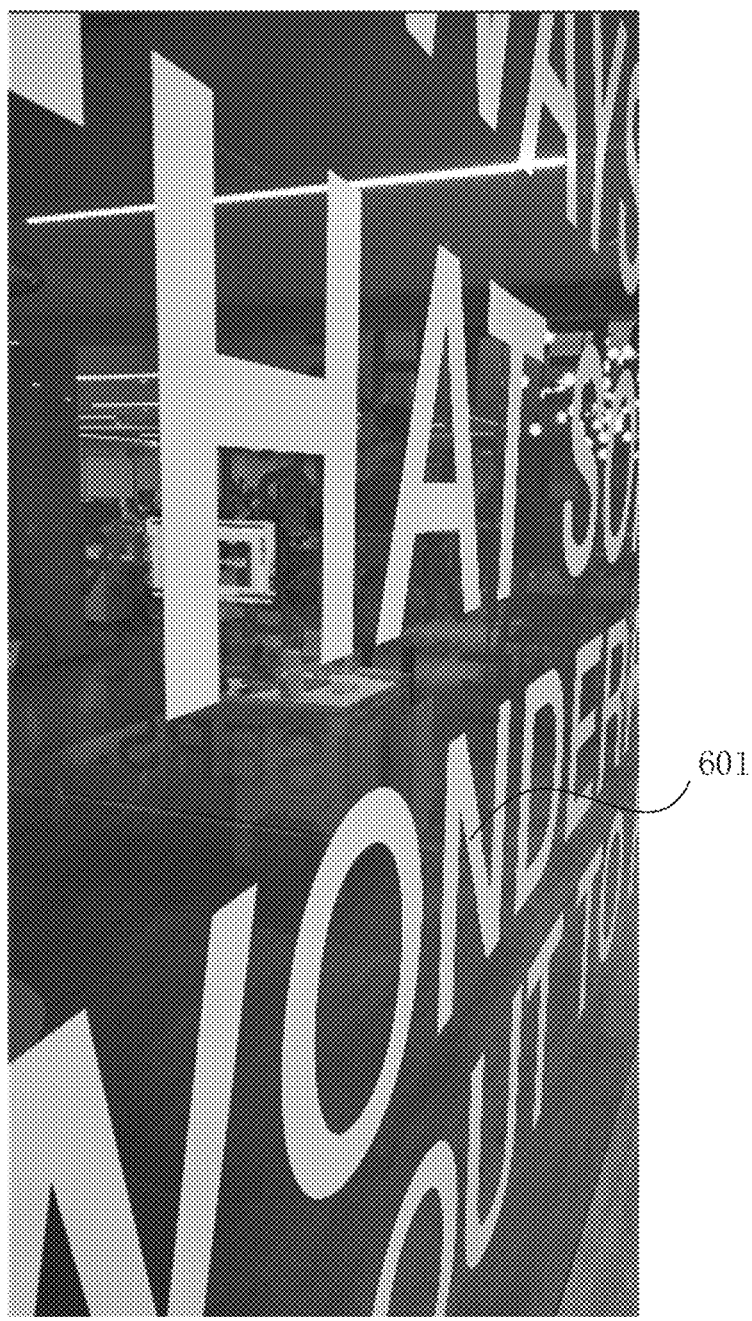
FIG. 7B is a schematic diagram illustrating a target image displaying interface in a portrait state according to some embodiments of the disclosure.
Figure 7C:
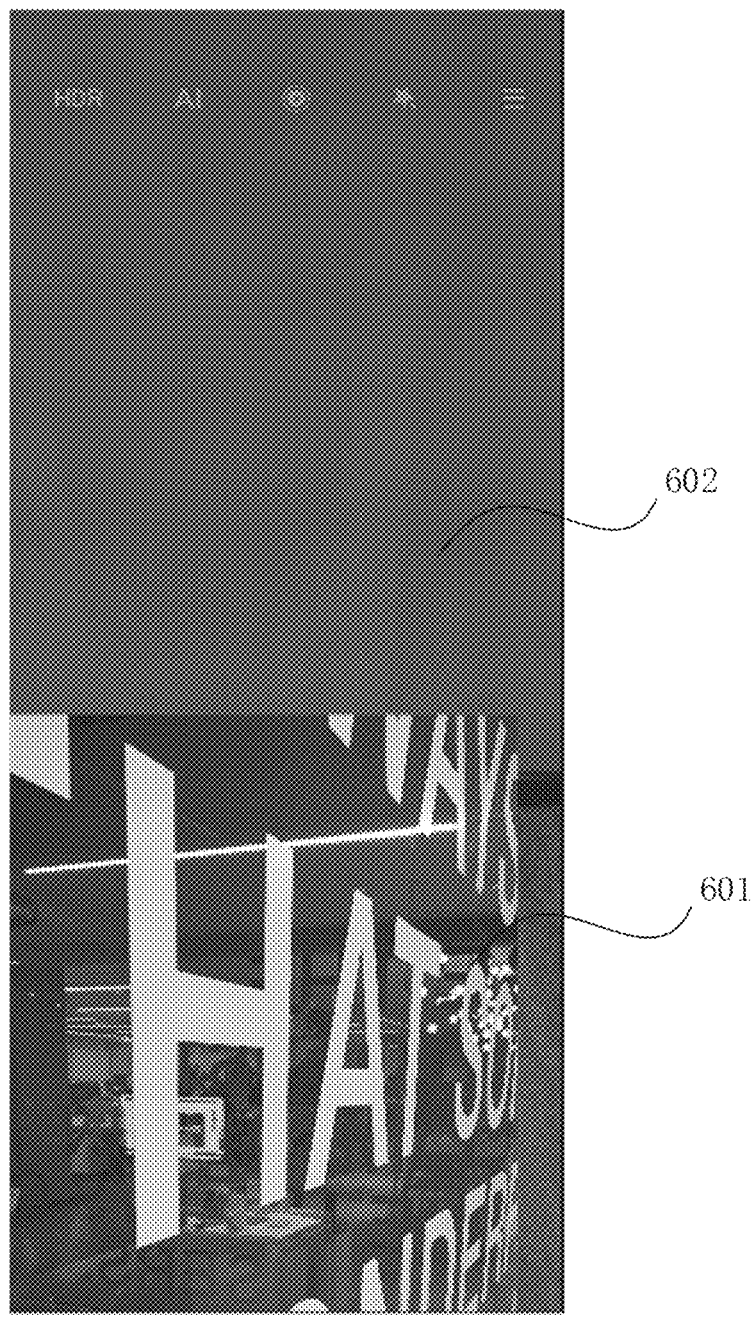
FIG. 7C is a schematic diagram illustrating a photo-taking interface of a camera application in a portrait state according to some embodiments of the disclosure.
Figure 7D:
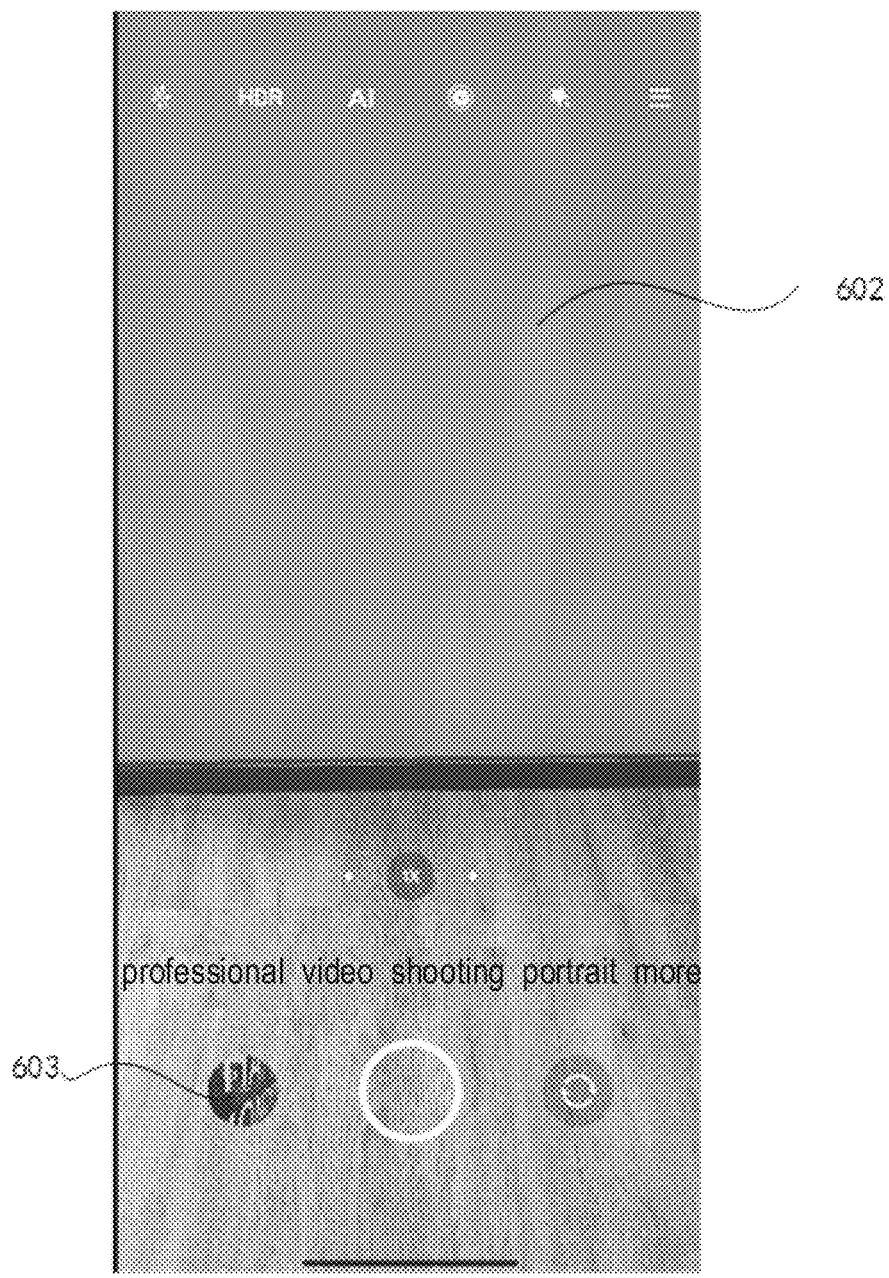
FIG. 7D is a schematic diagram illustrating another photo-taking interface of a camera application in a portrait state according to some embodiments of the disclosure.
Figure 7E:
FIG. 7E is a schematic diagram illustrating a target image displaying interface in a landscape state according to some embodiments of the disclosure.
Figure 7F:
FIG. 7F is a schematic diagram illustrating a photo-taking interface of a camera application in a landscape state according to some embodiments of the disclosure.
Figure 7G:
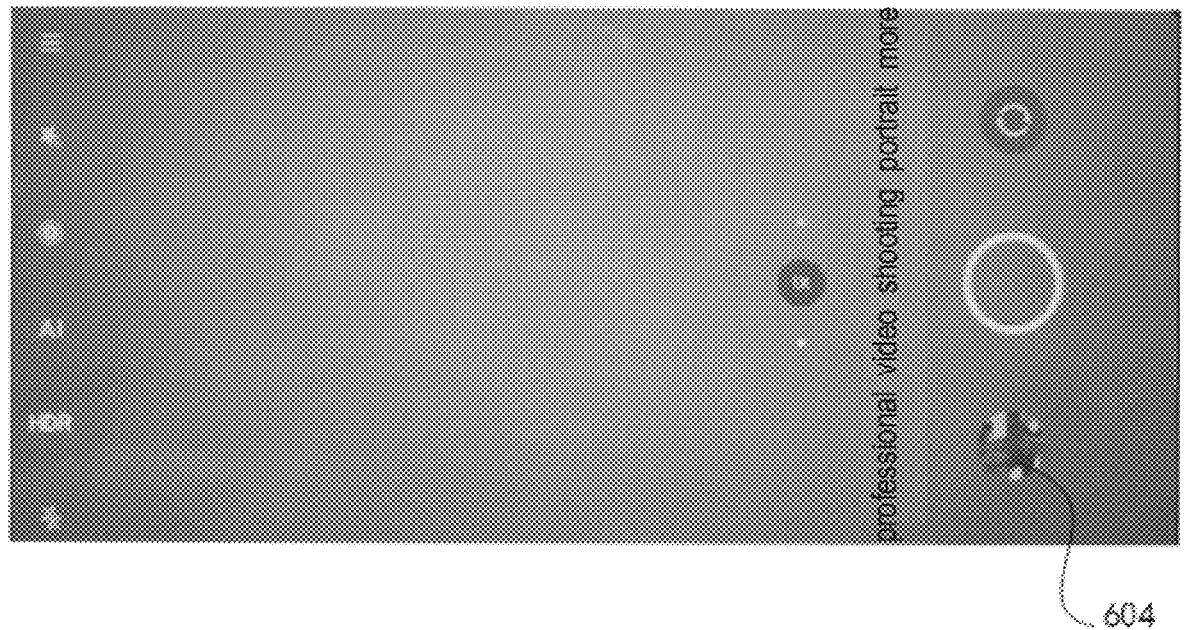
FIG. 7G is a schematic diagram illustrating another photo-taking interface of a camera application in a landscape state according to some embodiments of the disclosure.

A target image displaying interface in a portrait state is illustrated in FIG. 7B. A photo-taking interface of a camera application in a portrait state is illustrated in FIG. 7C. Another photo-taking interface of a camera application in a portrait state is illustrated in FIG. 7C. A target image displaying interface in a landscape state is illustrated in FIG. 7E. A photo-taking interface of a camera application in a landscape state is illustrated in FIG. 7F. Another photo-taking interface of a camera application in a landscape state is illustrated in FIG. 7G.

It is to be noted that, although only two photo-taking interfaces in the portrait state or in the landscape state are shown in the disclosure, more than two photo-taking interfaces can be included.

The target animation may be used to show a process of switching from the image storage program to the camera application program. As illustrated in FIG. 7A, the method for playing an animation may include the following.

At block S71, the target animation is generated based on the target image, or a preset target animation is obtained from the image storage program, in response to detecting a preset operation performed on the target image in the image storage program.

In some examples, after the image storage program is launched by the user on the terminal device to display images, if the user wants to switch the screen from the image storage program to the camera application, the user can perform a preset operation on the target image (which is for example a currently displayed image) in the image storage program. The target image overlays the camera application and is displayed as an upper layer of the camera application. Further, the terminal device may generate the target animation based on the target image or obtain a preset target animation from the image storage program in response to detecting the preset operation. The target animation can be played to represent that the terminal device switches the screen from the image storage program to the camera application after launching the camera application.

It is to be noted that the above preset operation may be set based on actual needs, such as dragging down or dragging up, as long as above preset operation is different from existing operations in the related art (e.g., sliding left or right to switch to a previous image or a next image), which is not limited in the disclosure.

In some examples, the target animation may include multiple frames, and each frame may be a thumbnail of the target image of a different size. In other words, the frames are generated by scaling the target image with respective scaling ratios. The thumbnails of the target image can be arranged from a large size to a small size. That us, from the perspective of users, the target animation shows a process that the target image is gradually reduced from a display state (i.e., the target image covers the entirety of the screen) illustrated in FIG. 7B to a thumbnail state illustrated in FIG. 7C, and further to a button state (i.e., an icon of the button) illustrated in FIG. 7D. In some examples, the icon of the button 603 illustrated in FIG. 7D may be a thumbnail of a set image stored in the image storage program, such as a thumbnail of an image that is most recently captured and stored in the image storage program or a thumbnail of an image that is most recently displayed and stored in the image storage program.

At block S72, the target animation is played in a transparent window.

For the relevant explanation and description of block S72, reference may be made to block S12 of FIG. 1, which is not repeated here.

With the method according to the disclosure, the target animation is generated based on the target image or the preset target animation is obtained from the image storage program in response to detecting the preset operation on the target image in the image storage program, and the target animation is played in the transparent window. In this way, it is possible to display the photo-taking interface of the camera application while displaying the target animation, such that the user can view both the target animation and the photo-taking interface of the camera application at the same time. The display effect of the animation is improved, visual smoothness of switching between the camera application and the image storage program is improved, and the user experience is enhanced.

Figure 8:
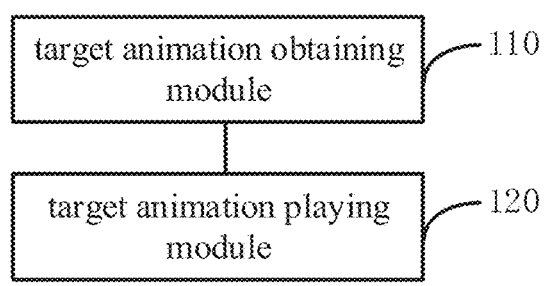
FIG. 8 is a block diagram illustrating an apparatus for playing an animation according to some embodiments of the disclosure.

FIG. 8 is a block diagram of an apparatus for playing an animation according to an exemplary embodiment. The apparatus is applied to a terminal device (e.g., a smart phone, a tablet computer, a notebook computer or a wearable device). As illustrated in FIG. 8, the apparatus includes: a target animation obtaining module 110 and a target animation playing module 120.

The target animation obtaining module 110 is configured to obtain a target animation in response to detecting a setting operation for switching between a camera application and an image storage program, the target animation being an animation of a target image displayed when switching between the camera application and the image storage program.

The target animation playing module 120 is configured to play the target animation in a transparent window, the transparent window covering an application interface of the camera application as an upper layer of the application interface.

In the above description, the apparatus of this embodiment acquires the target animation in response to detecting the setting operation for switching between the camera application and the image storage program, and then plays the target animation in the transparent window. In this way, it is possible to display a photo-taking interface of the camera application while displaying the target animation, so that the user sees the target animation and the photo-taking interface of the camera application at the same time, to improve the display effect of the animation, and to visually improve the smoothness of switching between the camera application and the image storage program, thereby enhancing the user experience.

Figure 9:
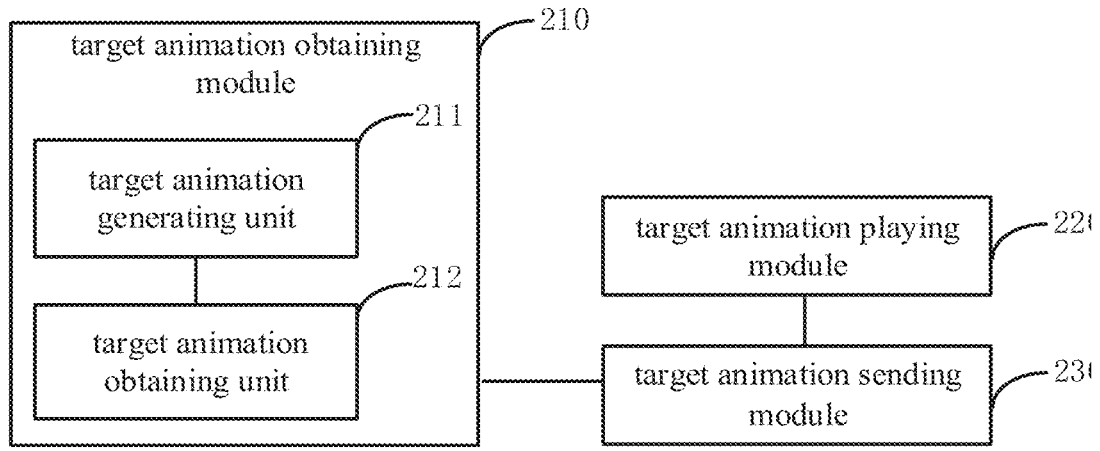
FIG. 9 is a block diagram illustrating an apparatus for playing an animation according to some embodiments of the disclosure.

FIG. 9 is a block diagram of an apparatus for playing an animation according to an exemplary embodiment. The apparatus is applied to a terminal device (e.g., a smart phone, a tablet computer, a notebook computer or a wearable device). The target animation obtaining module 210 and the target animation playing module 220 have the same functions as the target animation obtaining module 110 and the target animation playing module 120 in the foregoing embodiments, which is not repeated here.

In an embodiment, the setting operation includes a trigger operation performed on a preset control of the camera application.

On the basis, as illustrated in FIG. 9, the target animation obtaining module 210 further includes: a target animation generating unit 211 and a target animation obtaining unit 212.

The target animation generating unit 211 is configured to generate the target animation based on the target image cached in the image storage program.

The target animation obtaining unit 212 is configured to obtain a preset target animation from the camera application.

In an embodiment, the target animation generating unit 211 is further configured to:
  determine multiple frames for generating the target animation based on the target image, each frame is a thumbnail of the target image; and
  generate the target animation based on the multiple frames.

In an embodiment, the target animation generating unit 211 is further configured to:
  obtain parameters for generating the target animation; and
  determine the multiple frames for generating the target animation based on the parameters and the target image.

In an embodiment, the parameters include a first size of a first frame of the target animation, a second size of a last frame of the target animation, and a playback duration of the target animation.

The target animation generating unit 211 is further configured to:
  determine the number of frames contained in the target animation based on the playback duration and a display duration of each frame;
  determine a respective scaling ratio corresponding to each frame based on the number of frames, the first size and the second size; and
  determine the multiple frames based on the respective scaling ratio and the target image.

In an embodiment, the apparatus is applied to a terminal device, and the target animation generating unit 211 is further configured to:
  determine a first position of the first frame and a second position of a second frame based on a posture of the terminal device;
  determine a respective position of each frame based on the number of frames, the first position and the second position; and
  determine the multiple frames based on the target image, the respective scaling ratio and the respective position.

In an embodiment, the apparatus is applied to a terminal device, and the apparatus further includes: a target animation sending module 230 and the target animation playing module 220.

The target animation sending module 230 is configured to send the target animation to a system framework in response to detecting that the terminal device is in a landscape state.

The target animation playing module 220 is configured to play the target animation in the transparent window based on the system framework.

In an embodiment, the target image overlays the camera application and is displayed as an upper layer of the camera application, and the setting operation includes a preset operation performed on the target image in the image storage program.

On the basis, the target animation obtaining module 210 further includes: the target animation generating unit 211 and the target animation obtaining unit 212.

The target animation generating unit 211 is configured to generate the target animation based on the target image.

The target animation obtaining unit 212 is configured to obtain a preset target animation from the image storage program.

The specific manner of each module in the apparatus of the above embodiments performing operation has been described in detail in the method embodiments, which is not described in detail here.

Figure 10:
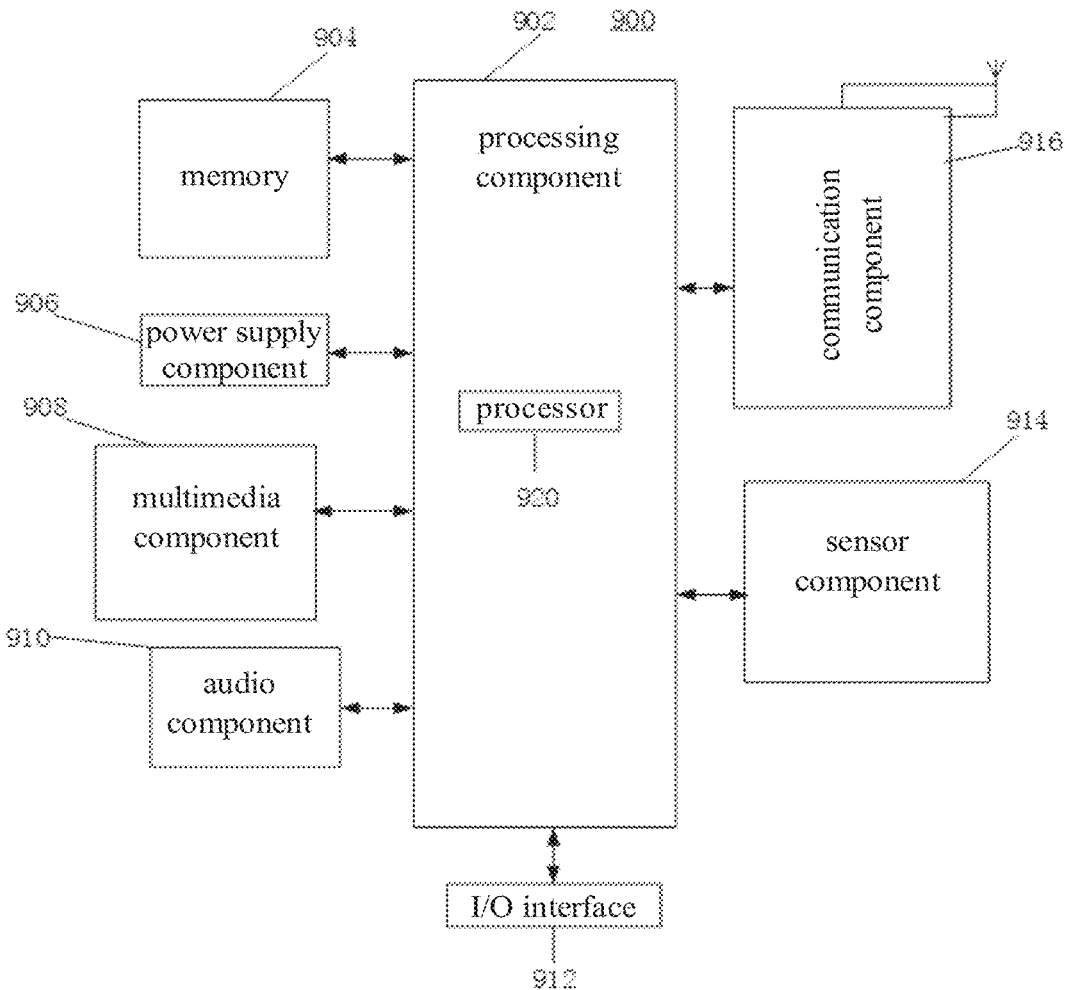
FIG. 10 is a block diagram illustrating an electronic device according to some embodiments of the disclosure.

FIG. 10 is a block diagram of an electronic device 900 according to an exemplary embodiment of the disclosure. For example, the electronic device 900 may be a mobile phone, a computer, a digital broadcasting terminal, a message transceiver device, a game console, a tablet device, a medical device, a fitness device and a personal digital assistant.

As illustrated in FIG. 10, the electronic device 900 may include one or more of the following components: a processing component 902, a memory 904, a power supply component 906, a multimedia component 908, an audio component 910, an input/output (I/O) interface 912, a sensor component 914, and a communication component 916.

The processing component 902 typically controls overall operations of the electronic device 900, such as the operations associated with display, telephone calls, data communications, camera operations, and recording operations. The processing component 902 may include one or more processors 920 to execute instructions to perform all or part of the steps in the above described method. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the electronic device 900. Examples of such data include instructions for any applications or methods operated on the electronic device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 906 provides power to various components of the electronic device 900. The power supply component 906 may include a power management system, one or more power sources, and any other components associated with the generation, management, and distribution of power in the electronic device 900.

The multimedia component 908 includes a screen providing an output interface between the electronic device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the electronic device 900 is in an operating mode, such as a photo-taking mode or a video mode, the front-facing camera and/or the rear-facing camera can receive external multimedia data. Each front-facing camera and rear-facing camera may be a fixed optical lens system or has focal length and optical zoom capability.

The audio component 910 is configured to output and/or input audio signals. For example, the audio component 910 includes a microphone (MIC) configured to receive an external audio signal when the electronic device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the electronic device 900. For instance, the sensor component 914 may detect an open/closed status of the electronic device 900, relative positioning of components, e.g., the display and the keypad, of the electronic device 900, a change in position of the electronic device 900 or a component of the electronic device 900, a presence or absence of user contact with the electronic device 900, an orientation or an acceleration/deceleration of the electronic device 900, and a change in temperature of the electronic device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the electronic device 900 and other devices. The electronic device 900 can access a wireless network based on a communication standard, such as WiFi, 2G, or 3G, or a combination thereof. In an exemplary embodiment, the communication component 916 receives a broadcast signal or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the electronic device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 904, executable by the processor 920 in the electronic device 900, for performing the above method. For example, the non-transitory computer-readable storage medium may be a ROM, a RAM, a CD-ROM, a magnetic tape, a floppy disc, an optical data storage device, and the like.

Those skilled in the art easily think of other embodiments of the disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the disclosure is not limited to the precise structure that has been described above and shown in the drawings, and various modifications and changes can be made without departing from the scope thereof. The scope of the claimed invention is limited only by the appended claims.

What is claimed is:

1. A method for playing an animation, comprising:
    obtaining a target animation based on a setting operation for switching between a camera application and an image storage program, the target animation being an animation of a target image displayed when switching between the camera application and the image storage program; and
    playing the target animation in a transparent window, the transparent window covering an application interface of the camera application as an upper layer of the application interface;
    wherein the method further comprises: in response to determining that a size of a frame of the target animation is less than a size of the transparent window, partly displaying a preview image through a remaining region of the transparent window other than a region displaying the frame;
    wherein obtaining the target animation comprises:
    obtaining a first size of a first frame for the target animation, a second size of a last frame for the target animation, and a playback duration for the target animation, wherein each frame is a thumbnail of the target image;
    determining a number based on the playback duration and a respective display duration of each frame;
    determining a respective scaling ratio for each frame based on the number of frames, the first size and the second size;
    determining multiple frames based on the respective scaling ratio and the target image; and
    generating the target animation based on the multiple frames.

2. The method of claim 1, wherein the setting operation comprises a trigger operation performed on a preset control of the camera application; and
    obtaining the target animation comprises:
    generating the target animation based on the target image cached in the image storage program; or
    obtaining a preset target animation from the camera application.

3. The method of claim 1, applied to a terminal device, wherein determining the multiple frames based on the respective scaling ratio and the target image comprises:
    determining a first position of the first frame and a second position of a second frame based on a posture of the terminal device;
    determining a respective position of each frame based on the number of frames, the first position and the second position; and
    determining the multiple frames based on the target image, the respective scaling ratio and the respective position.

4. The method of claim 1, applied to a terminal device, wherein the method further comprises:
    sending the target animation to a system framework based on the terminal device being in a landscape state; and
    playing the target animation in the transparent window based on the system framework.

5. The method of claim 1, wherein the target image overlays the camera application and is displayed as an upper layer of the camera application, and the setting operation comprises a preset operation performed on the target image in the image storage program; and
    obtaining the target animation comprises:
    generating the target animation based on the target image; or obtaining a preset target animation from the image storage program.

6. An electronic device, comprising:
    a processor;
    a memory for storing instructions executable by the processor; wherein, the processor is configured to:
obtain a target animation based on a setting operation for switching between a camera application and an image storage program, the target animation being an animation of a target image displayed when switching between the camera application and the image storage program; and
play the target animation in a transparent window, the transparent window covering an application interface of the camera application as an upper layer of the application interface;
wherein the processor is configured to: in response to determining that a size of a frame of the target animation is less than a size of the transparent window, partly display a preview image through a remaining region of the transparent window other than a region displaying the frame;
wherein the processor is configured to:
obtain a first size of a first frame for the target animation, a second size of a last frame for the target animation, and a playback duration for the target animation, wherein each frame is a thumbnail of the target image;
determine a number based on the playback duration and a respective display duration of each frame;
determine a respective scaling ratio for each frame based on the number of frames, the first size and the second size;
determine multiple frames based on the respective scaling ratio and the target image; and
generate the target animation based on the multiple frames.

7. The electronic device of claim 6, wherein the setting operation comprises a trigger operation performed on a preset control of the camera application; and
the processor is further configured to: generate the target animation based on the target image cached in the image storage program; or obtain a preset target animation from the camera application.

8. The electronic device of claim 6, wherein the processor is further configured to:
determine a first position of the first frame and a second position of a second frame based on a posture of the electronic device;
determine a respective position of each frame based on the number of frames, the first position and the second position; and
determine the multiple frames based on the target image, the respective scaling ratio and the respective position.

9. The electronic device of claim 6, wherein the processor is further configured to:
send the target animation to a system framework based on the electronic device being in a landscape state; and
playing the target animation in the transparent window based on the system framework.

10. The electronic device of claim 6, wherein the target image overlays the camera application and is displayed as an upper layer of the camera application, and the setting operation comprises a preset operation performed on the target image in the image storage program; and
the processor is further configured to: generate the target animation based on the target image; or obtain a preset target animation from the image storage program.

11. A non-transitory computer-readable storage medium, having computer programs stored thereon, wherein when the programs are executed by a processor, the processor is configured to:
obtain a target animation based on a setting operation for switching between a camera application and an image storage program, the target animation being an animation of a target image displayed when switching between the camera application and the image storage program; and
play the target animation in a transparent window, the transparent window covering an application interface of the camera application as an upper layer of the application interface;
wherein the processor is configured to: in response to determining that a size of a frame of the target animation is less than a size of the transparent window, partly display a preview image through a remaining region of the transparent window other than a region displaying the frame;
wherein the processor is configured to:
obtain a first size of a first frame for the target animation, a second size of a last frame for the target animation, and a playback duration for the target animation, wherein each frame is a thumbnail of the target image;
determine a number based on the playback duration and a respective display duration of each frame;
determine a respective scaling ratio for each frame based on the number of frames, the first size and the second size;
determine multiple frames based on the respective scaling ratio and the target image; and
generate the target animation based on the multiple frames.

12. The non-transitory computer-readable storage medium of claim 11, wherein the setting operation comprises a trigger operation performed on a preset control of the camera application; and
the processor is further configured to: generate the target animation based on the target image cached in the image storage program; or obtain a preset target animation from the camera application.

* * * * *